Figure 1:
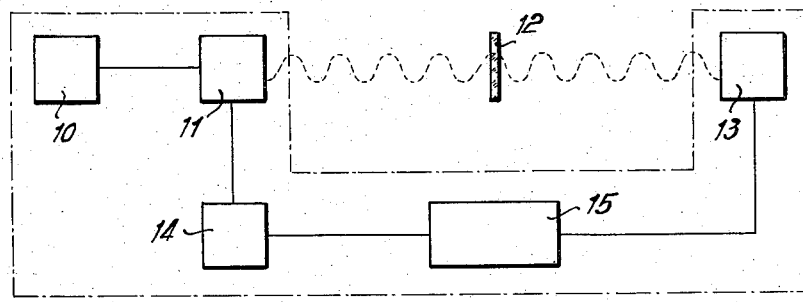

Feb. 27, 1962    H. POCHER      3,022,702
MEASURING DEVICES AND THE LIKE USING
CYCLICALLY MODULATED SIGNALS
Filed Dec. 16, 1958      3 Sheets-Sheet 1

INVENTOR
Hugo POCHER

BY

F. D. Prager
ATTORNEY

INVENTOR
HUGO POCHER
BY
ATTORNEY

INVENTOR
HUGO POCHER
BY
ATTORNEY

United States Patent Office 3,022,702
Patented Feb. 27, 1962

3,022,702
MEASURING DEVICES AND THE LIKE USING CYCLICALLY MODULATED SIGNALS
Hugo Pocher, Berlin-Friedenau, Germany, assignor to Continental Elektroindustrie A.G., Askania-Werke, Berlin-Mariendorf, Germany, a corporation of Germany
Filed Dec. 16, 1958, Ser. No. 780,899
11 Claims. (Cl. 88—1)

This is a continuation in part of an application filed on April 1, 1957, under Serial Number 649,938, now abandoned. The invention relates primarily to a measuring device of the type wherein a cyclically modulated signal, subject to electronic cycle control, is generated and transmitted and subsequently, after remote reflection, received for measuring purposes, the phase of the signal as generated being compared with that of the signal as received. Devices of this kind are used for measuring distances and the like.

Although the electronic art has made great progress in generating cyclic modulations, by oscillators, up to very high frequencies, and although it has become possible to control such oscillators with considerable accuracy as to the uniformity of their frequency, nevertheless great difficulties are still being encountered in certain practical utilizations of such developments, for a variety of reasons, particularly the substantial cost of obtaining high accuracy of such systems. It has therefore been a primary object of the present invention to provide a measuring system of the above type of high accuracy but relatively low cost. There has been a great demand for such a system, particularly in the field of photoelectric measurements of distances and the like.

It has been found that a serious source of errors in devices of this kind lies in fluctuating operating conditions in the instrument. Among the most troublesome fluctuations encountered in this connection are the variations of voltages applied to photomultiplier tubes and to similar elements of the measuring system; such variations have affected the velocities of electrons ejected by photon impacts, and influences of this type in turn have been found to affect both the accuracy and the sharpness of measurements otherwise obtainable and thereby to distort the required determination of phase angles between emitted and received signals or radiations. It is therefore a primary object of this invention to avoid such errors and for this purpose to avoid disturbing effects of photomultiplier voltage fluctuations, in a photoelectric measuring system.

Previously it was necessary for the preservation of the accuracy of such a system to employ costly and complex arrangements in an attempt to substantially avoid the fluctuation of voltage itself and thereby more or less to avoid phase disturbances. It is however extremely difficult as well as expensive in an instrument for practical use to stabilize voltage conditions and the like, to such an extent as is required in the extremely sensitive measuring systems considered herein; and it was therefore impossible hitherto to reduce the instrument errors to the desired low magnitudes except at prohibitive cost. It has therefore also been proposed to eliminate such errors by devices for frequent recalibration of phototube circuits and associated parts; however, that method is of limited application, as it involves recurrent, troublesome manual service operations and as errors may still set in during a measurement. Thus it is a particular object of the present invention to eliminate problems of the indicated type by automatic means, operating if and as required, at high frequencies, and nevertheless to keep the photoelectric instrument as simple, compact and economical as is required, for example, in the case of distance meters to be used in the field.

These objects have been achieved by the use of a photoelectric instrument and phase-comparison system wherein, instead of attempting avoidance or elimination of fluctuating electronic operating conditions, mainly of phototubes, such conditions are symmetrically applied to phototubes or the like which for this purpose are electronically duplicated, while serving different and non-symmetrical functions in the system.

Figure 2:
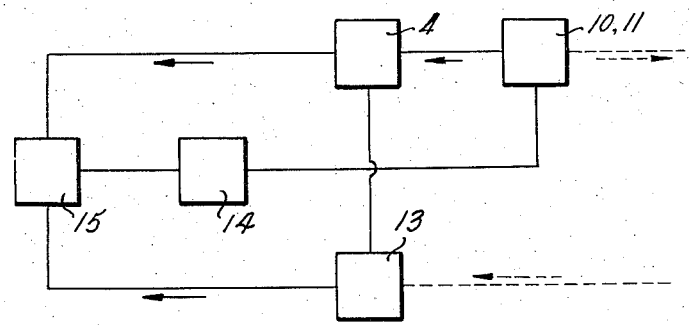
Figure 3:
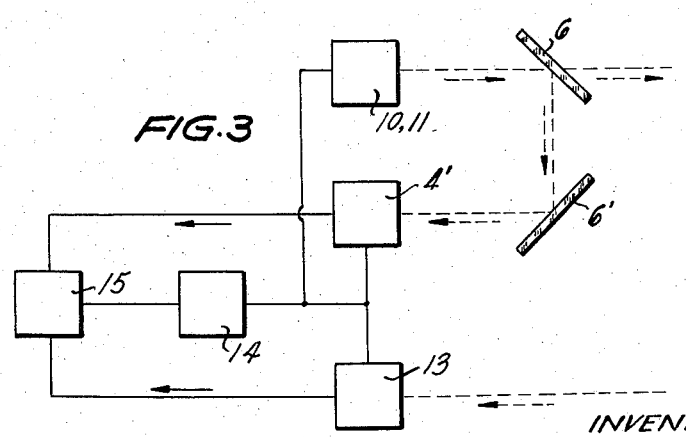
Figure 4:
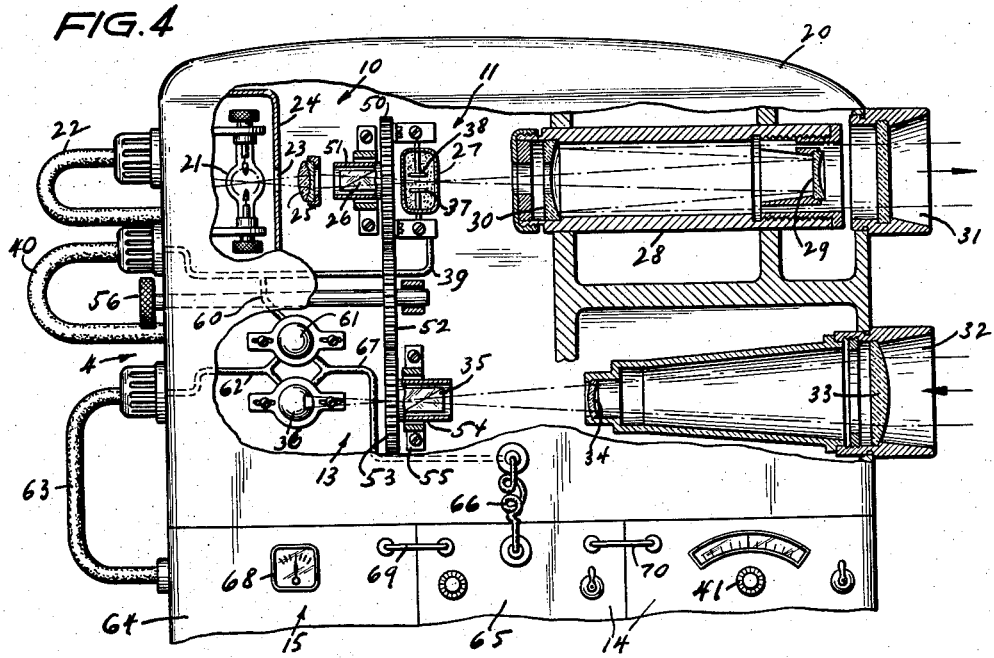
Figure 5:
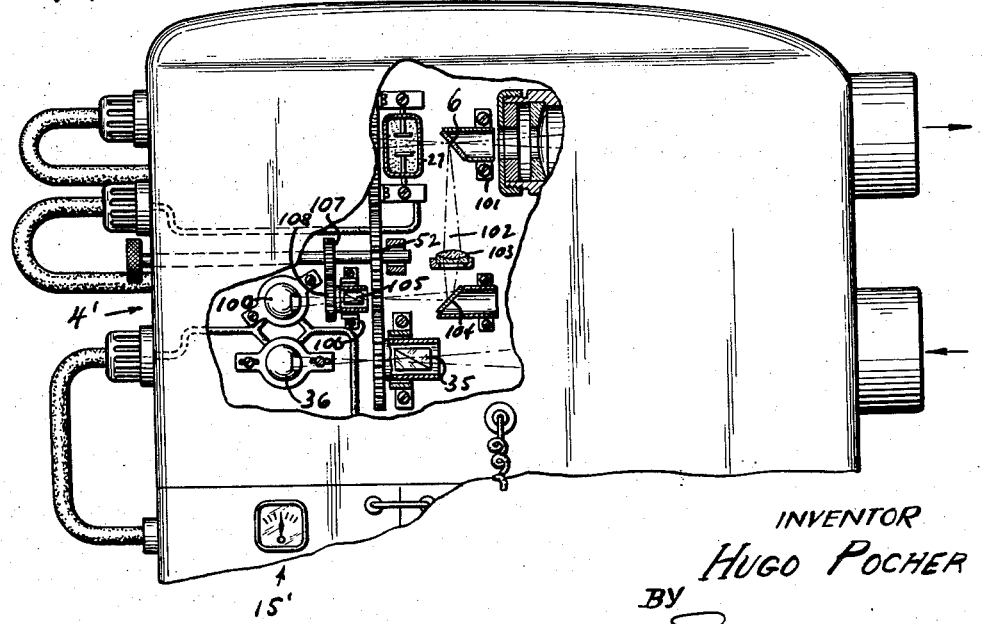
Figure 7:
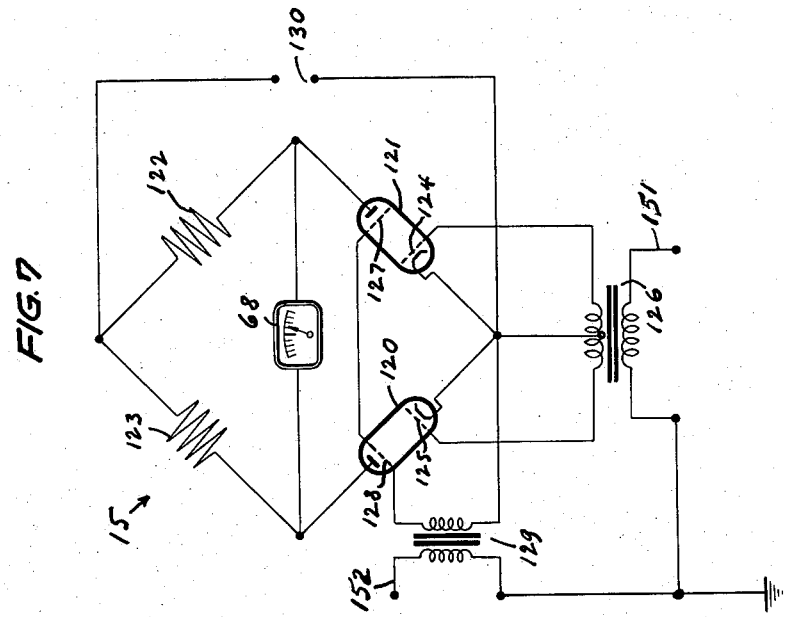
Figure 6:
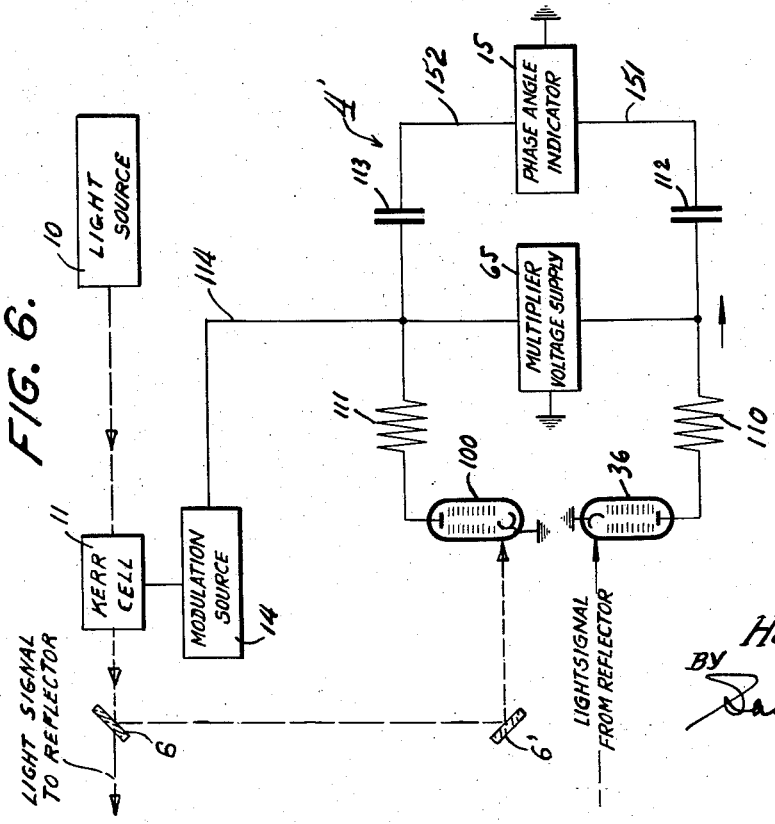

The details will be understood from the description which follows, wherein reference is made to the drawing appended hereto. FIGURE 1 is a block diagram of a distance meter, for basic explanation of basic problems underlying the present method and means. FIGURE 2 is a block diagram of an instrument according to this invention, with a somewhat more detailed but still schematic representation of the different basic elements. FIGURE 3 is a further diagram similarly illustrating a modified instrument according to this invention. FIGURE 4 shows in side view, partly broken away in section, the actual construction of an instrument of the type schematically shown in FIGURE 2. FIGURE 5 is a view similar to FIGURE 4 but pertaining to an instrument of the type schematically shown in FIGURE 3. FIGURE 6 is a schematic optical and electrical circuit diagram of the instrument of FIGURE 5; and FIGURE 7 is a more detailed diagram of a certain circuit, appearing in FIGURE 6 in block form.

Referring first to the block diagram of FIGURE 1: A light source 10 has its output controlled by a cyclic light modulator 11 such as a Kerr cell, a P-type crystal cell or the like, to transmit a modulated light signal to a remote reflector 12. The reflected modulated signal— very schematically shown, for simplicity of illustration, as continuing in the direction of incidence—reaches a receiver 13, wherein a photosensitive element is provided, usually a photosensitive electron multiplier. These transmitting and receiving devices are known to the art, for instance from the co-pending application of Hildebrand, Serial No. 623,571, filed on November 21, 1956, now U.S. Patent 2,909,958, assigned to the same assignee as the present invention.

A source 14 of cyclic modulation of electrical voltage or current, comprising an oscillator, operates the light modulator 11 and thus governs the receiver 13, being connected to the latter through a phase comparator 15 for comparing the phase of the generated signal (comparison or standard signal), arriving along line 14—15, with the phase of the received signal, arriving along line 13—15 after delay by transmission 11—13, to measure said delay. As initially mentioned, such measurement by phase comparator 15 is likely to be seriously distorted, by changes of electron velocity in the receiving electron multiplier instrument 13, and such changes are likely because it is impossible in an economical system to fully avoid changes of voltage impressed on the multiplier. The variation of voltage is usually caused or influenced by factors such as variations of thermal conditions prevailing in the measuring instrument, particularly when it is used in the field.

According to the present invention at least some such distortions are freely allowed to occur but are prevented from affecting the measurement of distance 11, 12, by symmetrically duplicating and compensating electronic distortions in system 14, 15, 13. Thus, according to one aspect of the present method this system 14, 15, 13 is arranged and operated so as to become electronically symmetrical about element 15, with respect to electrical parameters influencing the comparison of signals. The basically required and previously known functions of the system or method, shown in FIGURE 1, are performed, but are electronically or photoelectrically supplemented in a novel way.

This is more specifically indicated by FIGURE 2. In this figure the generation of a light signal, as well as the cyclic electrical modulation thereof, is shown by a single block 10, 11; the area of remote reflection is not shown but assumed to be in the distance, at the right; and the receiver functions are outlined by a block 13. The broken lines at the right indicate the path of the signal; the arrows associated therewith show the traveling directions of the signal before and after remote reflection. The phase comparison area 15 and the modulation source 14 are connected with receiver 13, as in FIGURE 1, and are further connected with transmitter 10, 11 not only by the direct connection shown in FIGURE 1 but also by a secondary electron multiplier 4, separately interposed between elements 15 and 10, 11 for comparison of the phase of the signal as transmitted (indexing signal or indexing energy; see upper horizontal arrows pointing toward left) with the phase of the received signal (lower horizontal arrow).

Apparatus for carrying out the method of the diagram, FIGURE 2, is shown in FIGURE 4. Electrooptical distance meter housing 20 contains light source 10 in the form of lamp 21, energized via cable 22 and having aperture 23 in lamp housing 24. Light source 10 also includes optical imaging system 25 in front of aperture 23, directing light from said aperture through a polarizer 26. Cyclic modulator 11 comprises Kerr cell housing 27 into which the light is focused by system 25 and wherefrom such light reaches transmitting objective 28, shown as a mirror objective of the Cassegrain type. From reflector 29 and counterreflector 30 of this objective the light passes through aperture 31 of housing 20, on the way to the remote reflector, disposed far at the right.

Returning from said remote reflector, the light passes through a second aperture 32, forming part of receiver 13 in housing 20. Optical imaging systems 33, 34 of the receiver direct the light through polarization analyzer 35 onto a photocathode of light sensitive element or multiplier 36. While certain gears are interposed between polarizer 26 and Kerr cell 27 and also between analyzer 35 and photo tube 36, as will be explained hereinafter, it will be understood that central portions of such gears are broken off or formed of transparent material in well known ways, not shown, so as not to interfere with the transmission and reception of the light signals.

Similarly it will be understood that Kerr cell 27, a device well known by itself, has a pair of electrodes 37, 38 separated by suitable liquid such as nitro-benzol ($C_6H_5NO_2$) which is normally isotropic but becomes birefringent when exposed to an electrostatic field by energization of said electrodes. For this latter purpose the electrodes of the Kerr cell are connected by cable 39, 40 with modulation source or frequency generator 14, adjustable at 41. Desirably such a generator is of the continuously variable type, which allows operation of Kerr cell 27 at various required modulation frequencies. The polarization plane or condition of the light generated at 10 and polarized at 26 is periodically altered by cell 27, in response to modulations generated at 14 and adjusted at 41.

Analyzer 35 is angularly rotated relative to polarizer 26 in a well known way, so as to pass light only during predetermined phases of the modulation cycles impressed upon the light signal by Kerr cell 27, for instance to pass light when Kerr cell 27 is energized and to stop it when the cell is deenergized. As a result phototube 36 is exposed to light in cyclically modulated fashion, the general wave shape of the cyclic modulation of light arriving at 36 being the same as the general form of electrostatic modulation at 37, 38.

The phase comparsion which is thus available at 15 is subject to disturbance by internal processes within tube 36, as initially explained, unless great caution is applied either to minimize such processes or otherwise to avoid such disturbance. In order to illustrate the delicate nature of the process it may be mentioned in passing that, as disclosed in the co-pending application of Hildebrand, mentioned above, disturbance of the measurement is possible even by sources of "noise" connected with the light signal itself, for instance by unavoidable stray light from background regions. As explained in greater detail in said Hildebrand application, such undesirable influences can be eliminated by synchronously rotating analyzer 35 and polarizer 26, and in the present case also Kerr cell 27, until minimum noise has been established. For this purpose polarizer 26 and Kerr cell 27 are rigidly secured to gear 50, having one of the aforementioned central apertures for passage of the light, the gear being pivoted at 51. An intermediate gear 52 connects gear 50 with a similar gear 53, carrying analyzer 35 and pivoted at 54, the several pivots having support members 55 and the connecting gear 52 being rotatable by knob 56 on the outside of housing 20.

The instrument-caused disturbance of the measurement, which is corrected by the present invention, would remain even after correction of the stray light effects just mentioned, unless the disturbance were eliminated. The disturbance would cause not only spurious phase shifts, but also undesirable time spread effects and the like. As already indicated, these disturbing effects are largely occasioned by the operating conditions of elements such as phototube 36.

This will be clearly understood on consideration of the way in which such tube operates. In such a tube and particularly in one of the secondary electron multiplier type, which provides powerful amplification of weak electron currents obtained from a photoemissive cathode, by means of a series of added emissive electrodes or dynodes, electrons are knocked out of the emissive electrodes, and usually this occurs in a series of electrodes starting with the cathode and continuing with successive dynodes to provide a total gain of electron energy which may for instance be millionfold. In the present application, however, a problem lies in the maintenance of proper voltages on the cathode and successive dynodes. The electrons travel between said electrodes at high but finite velocities, which are affected by said voltages in such a degree as to cause significant apparent phase shifts, even in case of apparently minor voltage change. It must be considered that in effect the signal received at 32 is transported through the electron multiplier in a succession of steps, each of which can be accelerated or decelerated by a modification of voltage.

The law relating to electron velocity, known as the Einstein photoelectric equation, has been known for a long time, and likewise instruments of generally similar type to the present one have been proposed and used for a considerable time. Nevertheless the present invention is believed to provide for the first time an instrument wherein the deleterious effects, for photoelectric measurements, of certain components of the Einstein equation are eliminated from the operation of an instrument of the present type. The equation is frequently written in the following form:

$$E_k = hf - W$$

wherein $E_k$ is the kinetic energy of the ejected electron, $h$ is Planck's constant, $f$ is the photon frequency and $W$ is the so-called work function of the photo-emissive or electron-emissive surfaces. It is in connection with said work function $W$ that the aforementioned voltage fluctuations and related influences have been found to disturb the measurements. This will be appreciated when it is considered that the equation, when solved for $W$, furnishes a value which is dependent only on physical constants, such as $h$, on the frequency $f$ employed, which is determined by system 14, 41, and on the energy supplied by said voltage, which controls value $E_k$.

Approaching the same matter from the standpoint of a specific multiplier, it has been found for instance that the multiplier sold by Radio Corporation of America under model number RCA 1P21 is subject to a phase variation, in the operating region, producing an uncompensated distance error of the order of .005 times the variation of applied voltages.

In view of demands which are presently made as to the accuracy to be provided by an instrument of the present type, it is frequently necessary that such errors, or even smaller errors, be avoided and that accordingly there be provided either a voltage which remains constant with a tolerance of not more than five parts in ten thousand, or some equivalent of such a voltage. Theoretically, it is possible to maintain a voltage constant within such limits, but the use of the required methods and means is economically and practically intolerable in most of the instruments in question.

According to the present invention the full equivalent of a system maintaining the aforementioned uniformity of voltage is provided by the relatively simple and inexpensive utilization of element 4, FIGURE 2, which has already been described in general. This element serves to make sure that any variations of supply voltage, affecting electron velocities, automatically affect systems 13—15 and 4—15 simultaneously, regardless whether such variation develops gradually during a day or week or rapidly during a measurement.

In the apparatus of FIGURE 4 the said system 13—15 and 4—15 includes in the first place a branch 60 of cable 39—40 from modulation source 14 to Kerr cell 27. The principal element of compensating system 4, in the present embodiment, is a grid controlled secondary electron multiplier 61 connected to cable 60 and also connected by cables 62—63 with phase-comparing and indicating device 15. The said device receives the output of photosensitive element 36, through separate conductors in the same cables 62—63. The supply voltages for both multipliers 36, 61 are supplied by a power source 65, forming part of modulation source 14. Comparator 15 has an indicator 68 and is connected with power source 65 by cable 69, while a cable 70 connects the power source with modulation-adjusting device 14, 41.

The circuitry of cables 39, 40, 62, etc. will be discussed presently; however, reference will first be made to FIGURE 5, wherein electron multiplier 61 is replaced by a second multiplier phototube 100, thereby modifying the compensating system 4 in the way schematically shown in FIGURE 3. For this purpose, and as shown in these figures, there is interposed on the light signal path from light source 10 to the remote reflector a partial reflecting element such as a plane-parallel plate of clear glass 6, which deflects a small fraction of the total light energy, said fraction then being directed by a total reflector 6' into the secondary photoelectric element 4', the elements 6 and 6' being disposed at 45° to the primary light path. While light energy from source 10 may be directed to compensator 4' in a variety of ways, the described way allows particularly good utilization of the new principle of symmetrical arrangement of primary and secondary signal-sensitive elements, in accordance with this invention. The clear glass 6 need not remove any large part of the light energy from the primary light signal, which must traverse the distance to the remote reflector twice, often involving distances of several miles. In fact, glass 6 may best be treated to minimize inherent surface reflection.

In FIGURE 5 the glass plate 6 is shown as held in holder 101 and as forming a branch light beam 102, which is directed by optical imaging system 103 to full reflector 6' in holder 104, and thereby to the second phototube 100. A second polarization analyzer 105 is disposed between reflector 6' and tube 100 to perform the same function as does analyzer 35, said analyzer being desirably rotatable together with elements 26 and 35, in a bearing 106, in accordance with the principles of the aforementioned Hildebrand invention. There is accordingly provided an added gear 107, rotatable with the knob which serves to rotate the other gears, for rotating the second analyzer 105 by means of gear 108. Cables 109 and 63 serve to feed the output of tubes 36 and 100 to phase comparator 15'.

Referring now to the circuit diagram of FIGURE 6, which shows the circuitry of the apparatus of FIGURE 5: this circuitry desirably serves to transmit signals symmetrically not only into symmetrically arranged photoelectron multipliers 36, 100 but additionally, thereafter, through a circuit of substantially symmetrical nature, both transducers being in substantially identical electrical circuits with substantially identical couplings to the indicator 15, in order to minimize also such instrument-caused errors as might otherwise be created by further circuit elements, even after the compensation of errors caused by multiplier voltages. This further precaution is desirable mainly when and as high frequencies of cyclic modulation are impressed on the light signal. The anodes of multipliers 36 and 100 are therefore respectively connected to resistors 110, 111 which in turn are respectively connected to condensers 112, 113, employed as filters between multiplier voltage supply 65 and phase angle indicator 15. It will be understood that the system 65, 36, 100 also includes voltage divider circuitry connected with the schematically indicated dynodes of the two tubes and which need not be shown in this diagram. The oscillation generated at 14 is impressed upon the system 36, 100, 15 by circuitry schematically shown at 114.

Details of a phase angle indicator circuit 15, shown in block form in FIGURE 6, are illustrated in FIGURE 7. The circuit is shown as including a pair of tetrodes 120, 121, lying in the lower branches of a bridge, while symmetrically thereto, resistors 122, 123 lie in the upper branches of the bridge, the aforementioned indicator 68 being interposed on the diagonal of the bridge. Control grids 124, 125 of tubes 121, 120 receive, via conductors 151 and transformer 126, one of the two signals to be compared, from opposite terminals of said transformer and accordingly in opposite phase, while the other signal, the optical phase shift of which is to be measured, is applied in parallel and thus in equal phase to screen grids 127, 128 of tubes 120, 121, via transformer 129 connected with conductor 152.

It will be understood that in the operation of this phase indicator, during the first half of each cycle of an oscillation arriving at 126, the control grid of one tube blocks the flow of electrons from the cathode to the plate, while the control grid of the other tube allows such flow, so that during this half-cycle, current tends to flow through indicator 68 in one direction. During the ensuing half-cycle corresponding current tends to flow across the second tube and to flow through indicator 68 in the opposite direction, all this, however, subject to equal-phase screening effects caused at 129. The time average of the current actually flowing through instrument 68 is accordingly a function of the phase angle difference between electrical signals arriving at 126 and 129. The required power supply is of course connected to the bridge at 130; it can be derived from voltage supply 65.

By means of light circuits and electrical circuits as described it is not only possible without excessive complications to avoid objectionable instrument-generated phase shift, but also to avoid equally objectionable time spread. This will be understood on consideration of the following specific example. The multiplier made by Radio Corporation of America and known as RCA 6810, which is capable of relatively fine resolution, derives under normal operating conditions an approximately 10 millimicrosecond electrical impulse from a 1 millimicrosecond light impulse, when furnishing about 50% of maximum amplitude. Hitherto, all or part of approximately 9 millimicroseconds, forming the difference between these values, has tended to create a spurious phase shift. Such is no longer the case when identical time spreads are symmetrically provided, as is done in accordance with FIGURE 6.

It will be realized that, while two forms of systems and instruments and one circuit for the same have been shown, numerous variations are possible with respect to light circuit, electrical circuit, ultimate measurement and in many other respects.

I claim:

1. Apparatus for measuring distances, comprising: means for generating a beam of light; a light beam modulating and splitting system operable by a cyclic, electric voltage for deriving from said beam identically cyclically modulated light beams, one of major and the other of minor intensity; an optical system for transmitting the modulated light beam of major intensity to a light reflector disposed at the end of the distance to be measured; an optical system for receiving the light beam, returning with reduced intensity from the reflector; a photoelectrically responsive device for deriving a cyclic, electric voltage from the received light beam; a second photoelectrically responsive device having a voltage output separate from the first, for deriving a cyclic, electric voltage from the modulated light beam of minor intensity for continuous comparison of the phases of the derived voltages; and power supply means feeding operating electric power symmetrically to both of said photoelectrically responsive devices so that any variations of photoelectrical response due to thermal and other effects on the power supply means occur similarly in both photoelectrically sensitive devices, thereby preventing such variations from distorting said comparison.

2. Apparatus as described in claim 1 wherein said light beam modulating and splitting system includes a light valve, such as a Kerr cell, followed by a partial reflector of clear glass.

3. In apparatus for measuring distances comprising means for generating a beam of light, means for cyclically modulating the beam, an optical system transmitting the beam to a light reflector whose distance is to be measured, an optical system receiving the light beam returning from the reflector, a photosensitive device converting the returned beam to an electrical signal, a power source for the photosensitive device, means for producing a reference electrical voltage in synchronism with said transmitted beam, and means for comparing the phase of the signal and the reference voltage, the improved construction wherein the means for producing the reference voltage includes a second photosensitive device powered by the same power source and adjacent to the first photosensitive device, the electrical connections of the two photosensitive devices to the comparing means being substantially identical, so that phase shift drift in the first photosensitive device due to thermal and similar changes is substantially matched by corresponding drift in the second.

4. The improved construction of claim 3 wherein the second photosensitive device is substantially identical to the first, the means for producing the reference voltage including means for diverting a portion of the modulated transmitted beam to the second photosensitive device.

5. In a measuring device including means for producing a cyclically modulated transmitted light beam, a photomultiplier tube exposed to the light beam and having a power source, means for generating a voltage in reference phase relation to the transmitted light beam, and means for comparing the phase of the photomultiplier output and the reference voltage, the improvement wherein the generating means for the reference voltage includes a second and substantially identical photomultiplier having the same power source as the first photomultiplier, so that any phase change in the first photomultiplier output due to power source drift is accompanied by similar change in the reference voltage.

6. In a measuring device including a light source producing a cyclically modulated transmitted light beam, a light-sensitive secondary electron multiplier tube exposed to the reflection of the light beam from an object under measurement and having a power source, means for generating a voltage in reference phase relation to the transmitted light beam, and means for comparing the phase of the multiplier tube output and the reference voltage, the generating means for the reference voltage including a second secondary electron multiplier tube having the same power source as the first, so that any phase change in the first multiplier output due to power source drift is accompanied by similar change in the reference voltage.

7. The device of claim 6 wherein the second secondary electron multiplier tube is also light-sensitive, and the generating means includes means for directing light from the source to the second multiplier tube.

8. The device of claim 6 wherein the light source includes a modulating voltage and the second secondary electron multiplier tube has a grid connected to the source of modulating voltage.

9. The device of claim 6 wherein the secondary electron multipliers are closely adjacent and are connected to the phase-comparing means by substantially identical electrical transmission paths.

10. In an electro-optical measuring device, a modulated light source adapted to be directed through a path under measurement, a light transducer receiving light at the opposite end of the path under measurement, a second and substantially identical light transducer closely adjacent to the first light transducer, both transducers being in substantially identical electrical circuits, means defining a comparison light path independent of the path under measurement from the source to the second transducer, a phase comparison indicator, and substantially identical couplings between the transducers and the indicator, so that the indication of relative phase is substantially independent of all factors other than the light paths.

11. In an electro-optical measuring device having a light source, means for modulating the light source, means for producing a reference electrical signal of standard phase with respect to the modulation, a photosensitive electron multiplier having voltages applied to the electrodes thereof and receiving light from the source and producing an output voltage in accordance with the modulation, and means for comparing the phase of the reference signal and the output voltage, the improved construction wherein the means for producing the reference electrical signal includes a second electron multiplier having voltages applied to the electrodes thereof, and further including means for varying the voltages applied to the second electron multiplier in accordance with variations in the voltages applied to the first electron multiplier, so that phase changes in the output voltage of the photosensitive multiplier caused by voltage variations are substantially compensated by corresponding phase changes in the reference signal.

References Cited in the file of this patent

UNITED STATES PATENTS 2,147,810   Alford _____ Feb. 21, 1939

FOREIGN PATENTS 346,260   Great Britain _____ Apr. 7, 1931

OTHER REFERENCES

Bergstrand: "A Check Determination of the Velocity of Light," Arkiv for Fysik, vol. 3, No. 26, September 13, 1951, pp. 479–490. (Copy available in Patent Office Library.)

Compton: "Surveying With the Velocity of Light," Surveying and Mapping, vol. XIV, No. 3, July-September 1954, pp. 283–292. (Copy available in Patent Office Library.)